E. WHITELEY.
Cooking Apparatus.
No. 39,603.  Patented Aug. 18, 1863.
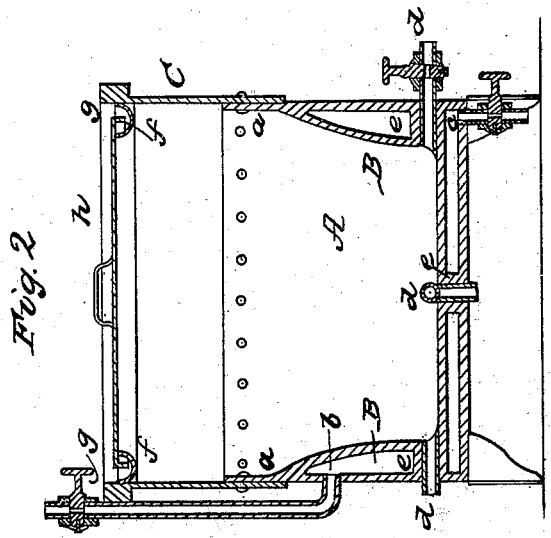
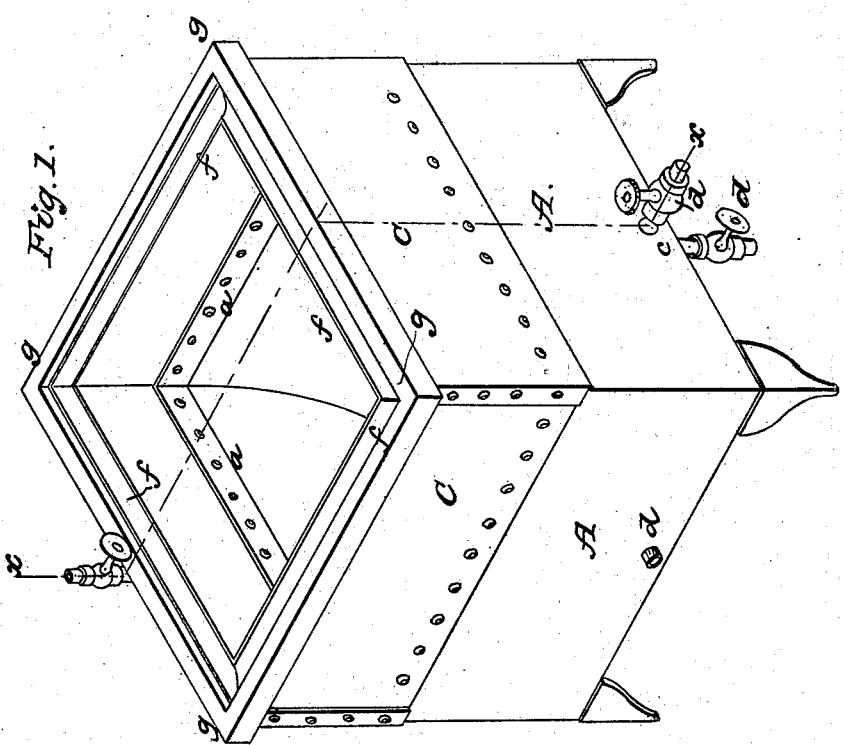
Witnesses
Inventor
E. Whiteley

UNITED STATES PATENT OFFICE.

EDWARD WHITELEY, OF CAMBRIDGE, MASSACHUSETTS.

IMPROVEMENT IN COOKING APPARATUS.

Specification forming part of Letters Patent No. 39,603, dated August 18, 1863.

*To all whom it may concern:*

Be it known that I, EDWARD WHITELEY, of Cambridge, in the county of Middlesex and State of Massachusetts, have invented certain Improvements in the Construction of Apparatus for Cooking by Steam, of which the following is a full, clear, and exact description, reference being had to the accompanying drawings, making part of this specification, in which—

Figure 1 is a perspective view of my improved apparatus, the cover being removed; Fig. 2, a section on line $x\ x$ of Fig. 1, showing the cover on.

Apparatus for cooking by steam, as heretofore constructed, has been made of metallic plates secured together by bolts or rivets, or by one kettle placed within a larger one, the flange or rim of the inner resting upon the rim of the outer kettle, and the joint was packed by a band of rubber between them. In both of these modes of constructing a difficulty was experienced from the leakage of steam at the rivet or bolt holes and joints, and at the points where the discharge-pipes passed through the steam chamber to the inside of the kettle. The method first above described was also exceedingly expensive, and the heads of the rivets rendered the interior surface difficult to cleanse.

My invention has for its object the removal of these objections; and it consists in constructing the steam-chamber of cast-iron in one piece, the holes or passages for the admittance of the outlet-pipes being made through a solid portion of the casting within the steam-chamber.

To enable others skilled in the art to make and use my invention, I will proceed to describe the manner in which I have carried it out.

In the accompanying drawings, A represents a square kettle cast in one piece with a hollow cavity or steam-chamber, B, surrounding it on the sides and bottom. To the upper portion or rim, $a$, of this casting is secured, by rivets or otherwise, a casing, C, of wrought-iron or other suitable material, which forms the upper part of the apparatus. Steam is admitted to the chamber B at $b$ and passes out at $c$.

$d$ are outlet-pipes provided with cocks, either of which may be used when required. The holes or passages into which these outlet-pipes are inserted are made through a solid portion, $e$, of the casting A, within the steam-chamber, as seen in Fig. 2, thus protecting the pipes from the action of the steam and preventing leakage at these points.

$f$ is a groove occupied by the condensed steam escaping from the kettle, and is placed below the rim $g$. The cover $h$ fits into this groove, and by this arrangement the water is prevented from boiling over the top of the kettle. The article to be boiled is placed within the kettle A, and the liquid is afterward drawn off through the pipes $d$.

I have heretofore spoken of the kettle as being of a square form, which I find usually preferable on account of its economy of space. Other forms may, however, be used as the case may require.

What I claim as my invention, and desire to secure by Letters Patent, is—

Casting the kettle A in one piece with its steam-chamber B and solid portions $e$, in the manner and for the purpose substantially as described.

E. WHITELEY.

Witnesses:
P. E. TESCHEMACHER,
N. W. STEARNS.